United States Patent
Casaccia

(10) Patent No.: US 9,420,231 B2
(45) Date of Patent: Aug. 16, 2016

(54) AUTOMATIC METADATA EXTRACTION AND METADATA CONTROLLED PRODUCTION PROCESS

(75) Inventor: Edward Marion Casaccia, Carmichael, CA (US)

(73) Assignee: GVBB HOLDINGS S.A.R.L., Luxembourg (LU)

( * ) Notice: Subject to any disclaimer, the term of this patent is extended or adjusted under 35 U.S.C. 154(b) by 0 days.

(21) Appl. No.: 12/982,650

(22) Filed: Dec. 30, 2010

(65) Prior Publication Data

US 2011/0173196 A1    Jul. 14, 2011

Related U.S. Application Data

(63) Continuation of application No. 11/990,804, filed as application No. PCT/US2006/033528 on Aug. 29, 2006, now abandoned.

(60) Provisional application No. 60/713,848, filed on Sep. 2, 2005.

(51) Int. Cl.
| | |
|---|---|
| G06F 7/00 | (2006.01) |
| G06F 17/00 | (2006.01) |
| H04N 7/16 | (2011.01) |
| G11B 27/034 | (2006.01) |
| G11B 27/11 | (2006.01) |
| H04N 21/235 | (2011.01) |
| H04N 21/4223 | (2011.01) |
| H04N 21/84 | (2011.01) |
| H04N 21/854 | (2011.01) |

(52) U.S. Cl.
CPC .............. *H04N 7/16* (2013.01); *G11B 27/034* (2013.01); *G11B 27/11* (2013.01); *H04N 21/235* (2013.01); *H04N 21/4223* (2013.01); *H04N 21/84* (2013.01); *H04N 21/854* (2013.01)

(58) Field of Classification Search
None
See application file for complete search history.

(56) References Cited

U.S. PATENT DOCUMENTS

| | | | |
|---|---|---|---|
| 6,018,738 A | 1/2000 | Breese et al. | |
| 6,608,930 B1 * | 8/2003 | Agnihotri et al. | ............. 382/176 |
| 6,629,104 B1 | 9/2003 | Parulski et al. | |

(Continued)

FOREIGN PATENT DOCUMENTS

| | | |
|---|---|---|
| EP | 1063611 | 12/2000 |
| EP | 1187472 A1 | 3/2002 |

(Continued)

OTHER PUBLICATIONS

Metadata Brodacasting of Personlaized service,Kang et al, ETRI Journal, vol. 25 (5), Oct. 2004.*

(Continued)

*Primary Examiner* — Augustine K Obisesan
(74) *Attorney, Agent, or Firm* — Arent Fox LLP

(57) ABSTRACT

Metadata generated at the outset of an audio visual program, such as a television undergoes transmission to a field device associated with a capture device operated by production personnel, such as a news reporter and/or a videographer to capture one of audio and/or video information. The production personnel will typically edit the metadata for incorporation into the file structure of audio and/or visual information captured by the capture device. A server receives and updates the original metadata using the metadata in the file structure of the capture audio and/or video information, thus effectively harvesting the original metadata.

33 Claims, 2 Drawing Sheets

(56) References Cited

U.S. PATENT DOCUMENTS

| | | | |
|---|---|---|---|
| 6,789,109 B2* | 9/2004 | Samra et al. | 709/220 |
| 6,847,555 B2 | 1/2005 | Toda | |
| 6,877,134 B1 | 4/2005 | Fuller et al. | |
| 7,295,975 B1* | 11/2007 | Bangalore et al. | 704/231 |
| 2002/0033842 A1* | 3/2002 | Zetts | 345/719 |
| 2002/0087601 A1 | 7/2002 | Anderson et al. | |
| 2002/0088000 A1 | 7/2002 | Morris | |
| 2002/0170068 A1* | 11/2002 | Rafey et al. | 725/112 |
| 2003/0001880 A1* | 1/2003 | Holtz et al. | 345/716 |
| 2003/0037038 A1* | 2/2003 | Block et al. | 707/1 |
| 2003/0070183 A1* | 4/2003 | Pierre et al. | 725/135 |
| 2003/0085997 A1* | 5/2003 | Takagi et al. | 348/143 |
| 2003/0154178 A1 | 8/2003 | McIntyre et al. | |
| 2003/0163480 A1* | 8/2003 | Takahashi et al. | 707/102 |
| 2003/0177130 A1 | 9/2003 | Todd | |
| 2003/0187820 A1* | 10/2003 | Kohut et al. | 707/1 |
| 2003/0195863 A1* | 10/2003 | Marsh | 707/1 |
| 2003/0221164 A1 | 11/2003 | Williams et al. | |
| 2004/0003415 A1 | 1/2004 | Ng | |
| 2004/0039755 A1 | 2/2004 | Kunze | |
| 2004/0126038 A1 | 7/2004 | Aublant et al. | |
| 2004/0128697 A1 | 7/2004 | Wood et al. | |
| 2004/0133605 A1* | 7/2004 | Chang et al. | 707/104.1 |
| 2004/0174434 A1 | 9/2004 | Walker et al. | |
| 2004/0199387 A1 | 10/2004 | Wang et al. | |
| 2004/0208061 A1 | 10/2004 | Toda | |
| 2004/0218902 A1* | 11/2004 | Yanagita | 386/52 |
| 2004/0244047 A1* | 12/2004 | Shinkai et al. | 725/115 |
| 2005/0002648 A1* | 1/2005 | Hoshino et al. | 386/69 |
| 2005/0018057 A1 | 1/2005 | Bronstein et al. | |
| 2005/0033760 A1* | 2/2005 | Fuller et al. | 707/100 |
| 2005/0044112 A1 | 2/2005 | Yamamoto | |
| 2005/0094798 A1* | 5/2005 | Yacoub | 379/265.12 |
| 2005/0134707 A1 | 6/2005 | Perotti et al. | |
| 2005/0198570 A1* | 9/2005 | Otsuka et al. | 715/515 |
| 2005/0203927 A1* | 9/2005 | Sull et al. | 707/100 |
| 2005/0210501 A1 | 9/2005 | Zigmond et al. | |
| 2005/0223034 A1* | 10/2005 | Kaneko et al. | 707/104.1 |
| 2005/0257241 A1* | 11/2005 | Faulkner et al. | 725/92 |
| 2006/0002572 A1* | 1/2006 | Smithers et al. | 381/104 |
| 2007/0067447 A1 | 3/2007 | Wong et al. | |
| 2007/0286567 A1* | 12/2007 | Yanagita | 386/52 |
| 2008/0018784 A1* | 1/2008 | Bennett | 348/439.1 |
| 2009/0254562 A1* | 10/2009 | Casaccia | 707/10 |

FOREIGN PATENT DOCUMENTS

| | | |
|---|---|---|
| EP | 1349165 | 10/2003 |
| EP | 1349165 A1 | 10/2003 |
| EP | 1349166 | 10/2003 |
| EP | 1550968 | 7/2005 |
| GB | 2359918 | 9/2001 |
| GB | 2387087 | 10/2003 |
| JP | 2001292410 | 10/2001 |
| JP | 2004129200 | 4/2004 |
| JP | 2004182275 A | 7/2004 |
| JP | 2004295568 A | 10/2004 |
| JP | 2004-319007 | 11/2004 |
| JP | 2005039354 | 2/2005 |
| JP | 2005307591 A | 11/2005 |
| JP | 2007013911 A | 1/2007 |
| KR | 20050006565 | 1/2005 |
| WO | WO0229519 | 4/2002 |

OTHER PUBLICATIONS

The Life cycle of multimedia metadat, Kosch et al, IEEE 2005.*
Making Metadata: A study of metadata creation for a mixed physical-digital collection, Marshall et al, ACM 1998.*
Metadata in Video Databases, Jain et al, SIGMOD Record, 23(4), Dec. 1994.*
Groger, "Automation Aids for TV Newsrooms," Fernseh-und Kino-Technik, vol. 56, No. 4, pp. 172-175, Apr. 2002.
Brodde, "Newsroom Computerisation Using the Media Object Server (M.O.S.)," Fernesh-und Kino-Technik, vol. 55, No. 1-2, pp. 48-51, Jan.-Feb. 2001.
Burke, "Electronic Television News Production System," Fernesh-und Kino-Technik, vol. 57, No. 6, pp. 276-278, May 2003.
Genzel, "Automation Systems for TV Production," Fernesh-und Kino-Technik, vol. 56, No. 4, pp. 186-189, Apr. 2002.
Internation Search Report, for PCT/US2006/033528, dated Feb. 28, 2007.
Translation of Notice of Reasons for Rejection mailed Jun. 5, 2012 in Japanese Patent Application No. 2008-529165.
English Translation of First Office Action regarding China Patent Application No. CN200680032161.2.
English Translation of Second Office Action regarding China Patent Application No. CN200680032161.2.
English Translation of Third Office Action regarding China Patent Application No. CN200680032161.2.
English Translation of Fourth Office Action regarding China Patent Application No. CN200680032161.2.
English Translation of Fifth Office Action regarding China Patent Application No. CN200680032161.2.
English Translation of Sixth Office Action regarding China Patent Application No. CN200680032161.2.
English Translation of Notice of Reasons for Rejection dated Jan. 10, 2012 regarding Japan Application No. JP2008-529165.
Canadian Office Action dated Oct. 27, 2014 regarding Canada Application No. CA2620154.
Summons to Attend Oral Hearing dated Feb. 8, 2016, regarding EP06802472.8.
EP Communication dated May 20, 2015 regarding EP06802472.8.
EP Communication dated Aug. 21, 2008 regarding EP06802472.8.
Canadian Office Action dated Dec. 23, 2015, regarding Canada Application No. CA2620154.

* cited by examiner

AUTOMATIC METADATA EXTRACTION AND METADATA CONTROLLED PRODUCTION PROCESS

CROSS-REFERENCE TO RELATED APPLICATIONS

This is a continuation application of pending U.S. patent application Ser. No. 11/990,804, entitled "Automatic Metadata Extraction and Metadata Controlled Production Process," filed on Feb. 21, 2008, which claims the benefit under 35 U.S.C. §365 to International Application PCT/US2006/033528, having the same title, filed Aug. 29, 2006, which claims the benefit of U.S. Provisional Patent Application No. 60/713,848, having the same title, filed Sep. 2, 2005, which are expressly incorporated by reference herein in their entirety.

TECHNICAL FIELD

This invention relates to a technique for capturing and processing metadata during production of an audio visual program such as a television news story.

BACKGROUND ART

Advances in the development of television production equipment allow recording devices like video recorders, servers and camcorders, for example, to record not only audio and/or video information, but metadata as well. Such metadata comprises data about the captured audio and/or video information. Such metadata can include simple information, such as the time and date of the capture of the associated audio and/or video information. More complex metadata can include identification of the content of the audio and/or video information, as well as data associated with authoring and editing of that content.

Techniques for capturing metadata in conjunction with the capture of audio and/or video information, as well as techniques for associating such metadata have become well known. What has proven elusive is the ability to make good use of the metadata. In other words, the problem facing production personnel is the generation of "useful" metadata that can assist production personnel, rather than the creation of metadata that simply gets stored without aiding in the production process.

Thus, a need exists for a technique for generating and associating useful metadata in conjunction with the production of audio-visual content, and particularly, event driven audio visual content, such a television news material.

BRIEF SUMMARY OF THE INVENTION

Briefly, in accordance with an illustrative embodiment of the present principles, there is provided a technique for associating metadata with at least one of audio and video information. The method commences by transmitting metadata to a field device associated with the capture of the at least one of the audio and video information so that the metadata can be used by an operator of that device. The metadata is also transmitted to a storage mechanism, such as a server or the like, destined to receive the at least one of the audio and video information along with edited metadata, such as edited metadata received from the field device. The metadata received at the server undergoes updating in accordance with the edited metadata. In this way metadata created at the outset of production can undergo editing by field personnel in association with the capture of the audio and/or video information.

In practice, the edited metadata from the field can serve to update the original metadata at a server that receives the audio and/or video information captured in the field by a capture device, such as a camcorder to the like. Thus, the updated metadata stored at the server will provide information useful for association with essence objects captured by the capture device to enable secure identification of such objects.

DETAILED DESCRIPTION

Figure 1:
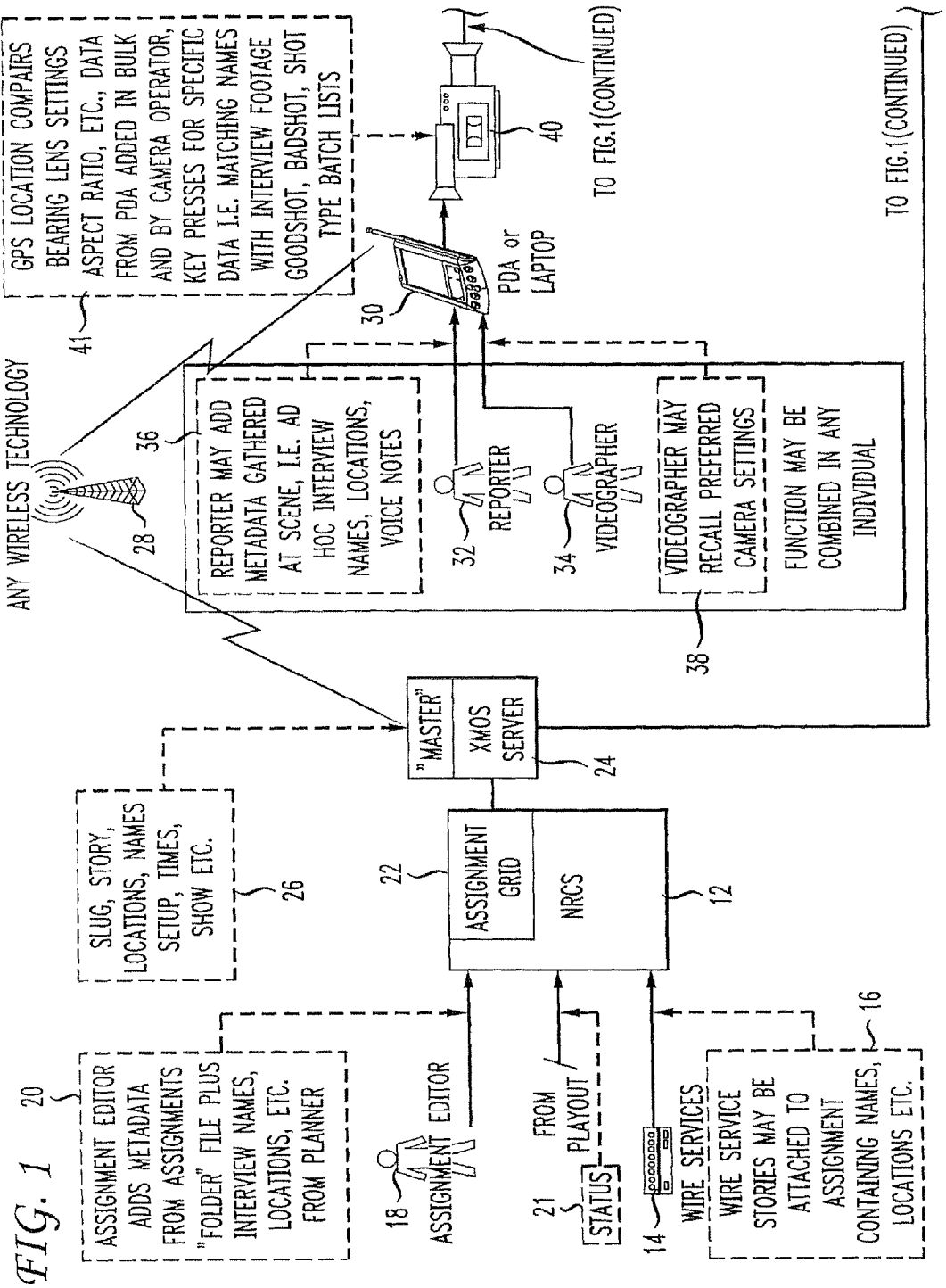
FIG. 1 depicts a block schematic diagram of a system for audio visual production illustrating metadata. flow in accordance with the present principles.
Figure 1:
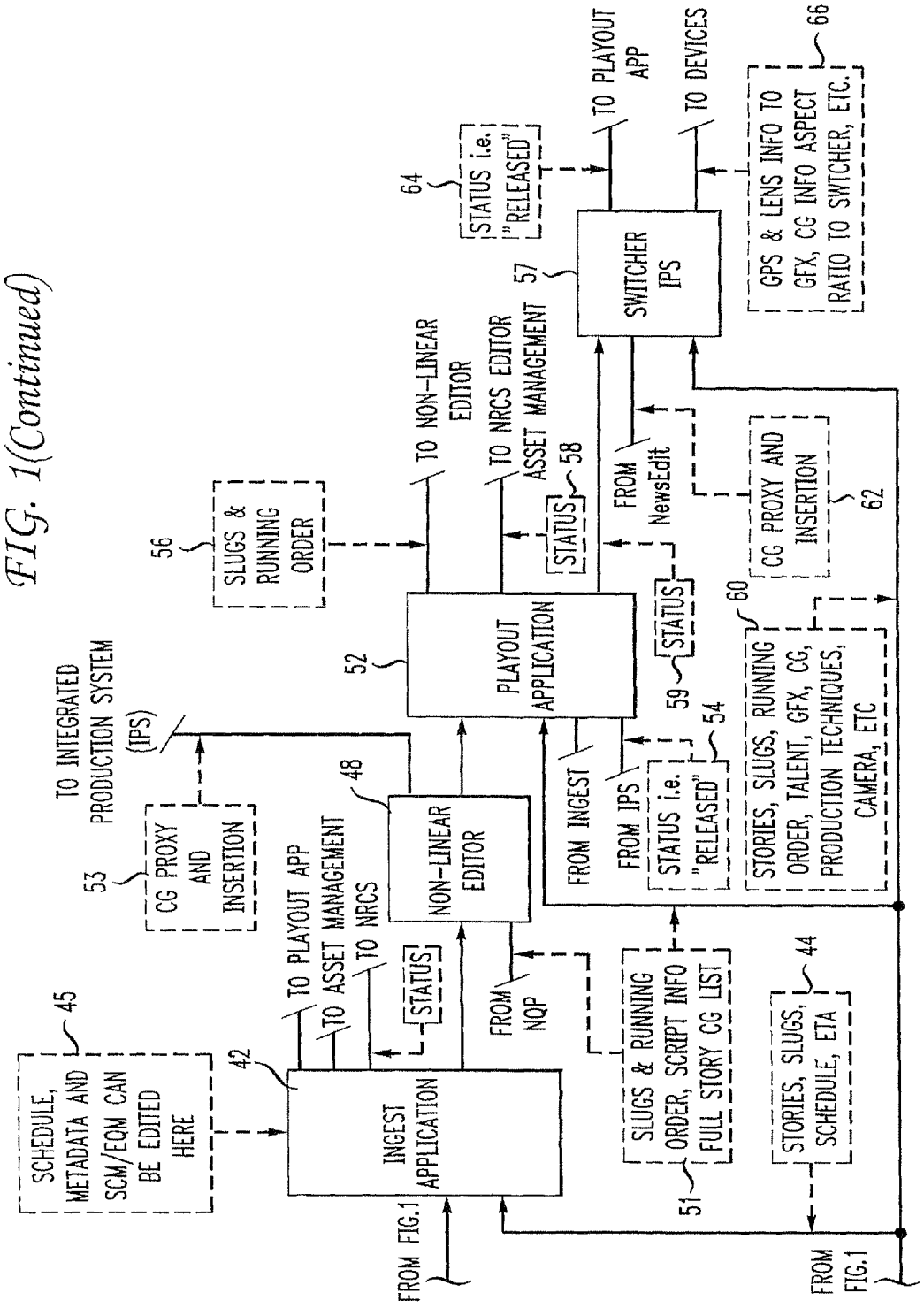

FIG. 1 depicts a block schematic diagram of a system 10, in accordance with the present principles for capturing useful metadata in connection with the capture of audio and/or video information. In the illustrated embodiment, the system 10 takes the form of a system for the production of television news although the metadata capture technique of the present principles has application to other systems. The solid lines within FIG. 1 indicate metadata flow whereas the dashed blocks indicate the type of metadata added and/or transmitted.

The system of FIG. 10 comprises a programmed processor 12, typically in the form of a news room computer system (NRCS) capable of generating assignment information for use by personnel who gather news stories. Newsroom computer systems capable of performing this function are available from manufacturers of automated news systems. The assignment information generated by the processor 12 can include metadata associated with a news story to be pursued by news gathering personnel. Such metadata can originate from a variety of sources. For example, the processor 12 can receive metadata from one or more news wires services 14 (only one of which is shown), such as Reuters, Associated Press, United Press International, for example. Metadata from the newswire service 14 can include names, story location(s) any other information, as indicated by the legend in block 16, for attachment to a story assignment generated by the processor 12. In practice, the processor 12 can also receive metadata from an assignment editor 18, an individual who creates and edits assignment information for the news gathering personnel. The assignment editor 18 will typically add metadata from a file, sometimes referred to as a "tickler" file, that can include the names of individuals for interview and story locations, as indicated by the legend in block 20. In addition, the processor 12 can receive status metadata, as indicated by the legend in block 21.

In the process of generating assignment information, the processor 12 provides assignment information, in the form of an assignment grid 22 that designates which news gathering personnel handle which stories. The processor 12 communicates the assignment information and metadata to a server 24 which also stores information. The server 24 can also store metadata as received through an interface 25, designated by the legend "mailer". Such status information can include slug data (i.e., data related to slugs which constitute blank space reserved for future stories), story locations, names, set-up times, show times as indicated by the legend in block 26.

A communications network 28, typically a wireless communications network transmits metadata from the server 24 to a field device 30, such as a laptop or personal computer for example, associated with a reporter 32 and videographer (cameraman) 34 assigned to a particular news story. The server 24 makes use of the assignment data contained in the assignment grid 22 to transmit appropriate metadata to the corresponding field device 30 so that the reporter 32 and videographer receive information related stories to which they have been assigned. In other words, the server 24 provides the reporter 32 and videographer 34 with instructions where to go, whom to interview, background wire stories from the wire service 14, notes from previous coverage and other information relevant to the assigned story or stories. Additionally, the metadata from the server 24 also includes the identity of the specific story assigned to a particular news team (e.g., the reporter 32 and videographer 34). This identity is usually referred to by the term Media Object Server Identification or MOS-ID. Using the field device 30, the reporter 32 can add and/or edit the metadata transmitted from the server 24. For example, the reporter 32 can add information related the identity (e.g., the name) of individuals interviewed as well as notes created by the reporter, as indicated by the legend in block 36. The videographer 34 can add metadata indicative of preferred settings and/or other information related to the captured image, as indicated by the legend in block 38. Although FIG. 1 depicts both the reporter 32 and videographer 34, a single individual could easily serve both functions.

The field device 30 communicates the metadata it has received to a capture device 40 that captures at least one of audio and/or video information. In practice, the capture device 40 takes the form of a camcorder, such as the Infinity series camcorder available from Thomson. Grass Valley, although the capture device could take comprise the combination of a video camera and a recording device, such as a videotape recorder, a video disc recorder or a server. The metadata received by the capture device 40 from the field device 30 can also include one of more of the following: Global Positioning Satellite information, compass bearings, lens settings, aspect ratio data, as well as any other data generated by the field device 30 and/or entered manually by one or more of the reporter 32 and videographer 34. Such metadata is indicated by the legend in block 41. The metadata can also include information entered directly to the capture device 40 by the videographer 34 through entry of one or more keys (not shown) on the capture device. Note that while the field device 30 and the capture device 40 are depicted as separate elements, it is possible that a single unit could serve the functions of the capture device and the field device.

The metadata from the field device 30 sent to the capture device 40, along with metadata entered to the capture device by the videographer 34, gets entered into the file structure of the captured audio and/or video information. Typically the file structure comprises the Media Exchange File or MXF structure but other file structures could be used. Entering such metadata into the file structure of the captured audio and/or visual information in the manner described resolves the longstanding metadata paradox, namely, how to create metadata at the outset of creating an audio-visual program, such as a news program. As discussed, the metadata incorporated in the file structure of the captured audio and/or video information captured by the capture device 40 includes the metadata already previously created by the assignment editor 18 and the wire service 14. Thus, the field device 30 simply "harvests" metadata already existing on the server 24.

The audio and/or video information captured by the capture device, and the metadata entered into the file structure of such information undergoes downloading from capture device 40 to a storage mechanism 42. In the illustrative embodiment of FIG. 1, the storage mechanism 42 bears the designation "Ingest Station (IS)" because it serves to ingest (receive) the audio and/or video information and associated metadata from the capture device 40. In addition to receiving metadata from the field device 30 via the audio and/or video information downloaded from the capture device 40, the storage mechanism 42 also receives the same metadata originally sent to the field device 30 by the server 24, including the MOS-ID identifying the server. Additional metadata, such as metadata related to stories, slugs schedules and estimated time of arrival (ETA), as indicated by the legend in block 44, can be added to the metadata from the processor 12, Further, the storage mechanism 42 can also metadata from an external source (not shown) related to show schedules as indicated by the legend in box 45.

The storage mechanism 42 has the ability to match the metadata received from the capture device 40 with the metadata received from the server 24 by matching the MOS-ID of the metadata received from the various sources. In particular, the storage mechanism 42 will look for the MOS-ID comprising part of the metadata in the file structure of the audio and/or video information downloaded by the capture device 40 to match it with the MOS-ID in the metadata received from the server 24. In this way, the storage mechanism 42 can know what to do with such metadata. More importantly, the server 42 can update the status information associated with audio and/or video information (e.g., news stories) created via the system 10 based on the updating of the metadata created by the processor 12 with edited metadata from the capture device 40.

Many benefits result from using the metadata created and/or edited entered by one or both of the reporter 32 and videographer 34 to update the original metadata stored in the server 24. For example, an editor using a news edit block, comprised of editing software running on a processor with an associated terminal, can edit audio and/or video information downloaded to the storage mechanism 42 using the metadata information to determine not only the identity of the reporter and videographer assigned to the story, but also the status of the story, including, but not limited to the estimated time of arrival (ETA) for material not yet downloaded.

Extraction and use of the metadata can occur elsewhere in production process. For example, consider the circumstance when a reporter 32 and videographer 34 have the task of interviewing a certain individual, say John Doe. During the interview process, the cameraman 32 and/or videographer 34 can check John Doe's name against the list of names in the assignment information comprising part of the metadata transmitted to the field device 30. If the name matches, then the cameraman 32 or videographer can add the name to one or more of the video frames captured by the capture device 40. The non-linear editor (NLE) program running on the news edit block 48 or elsewhere in the system 10 of FIG. 1 can enter the name into a character generator (CG) template with one more commands, thus avoiding spelling or transcription errors. This will also reduce the likelihood of misidentification of an interview subject.

The server 42 serves as the source of metadata for the news edit block 48. Additionally, the server 42 as serves as the metadata source for a simple data base (SDB), not shown that stories a play list of stories edited via the news edit block 48. Additionally the server 42 can also provide metadata to a news room computer system, an example of which is the Electronic News Room Product System (ENDS) available from Associated Press. The news edit block 48 not only receives the both audio and/or video information and associated metadata from the server 42 but also receives metadata associated with stories, slugs running order computer graphics production techniques and the like, as indicated by the legend in block 51. Such metadata can originate from one of several sources (not shown) such as an news room computer system (not shown) and or an integrated television production system (IPS) (not shown). The new edit terminal can provide edited news story clips (e.g., edited audio and/or video information), to a playback unit 50. In addition, the new edit terminal 48 can supply edited news clips (e.g., edited audio and/or video information) and accompanying metadata to the WS. The edited news clips (and accompany metadata) provided by the server 42 to the Integrated production System can include information, including metadata, from a character generator (not shown) as indicated by the legend in block 53. The new edit block 48 can also supply the edited news story clips to an asset management system (not shown) for other distribution. Such an asset management system can comprise the "NewsBrowse" system available from Thomson Grass Valley.

The playback unit 50 not only receives the news clips from the new block 48 but also receives audio and/or video information from the server 42 and from the IPS. The information from the IPS can also include metadata representing status information, as indicated by the legend in block 54. The playback unit 50 will feed edited news clips from the new edit terminal 48, as well as audio and/or video information from the server 42 and the IPS, to one or more of the news edit block 48, the news room computer system, the asset management system (e.g., NewsBrowse), an editor (not shown) and a switcher/production system (PS) 57. The clips provided by the playback system 50 to the news edit block 48 can include metadata associated with the slugs and their running order as indicated by the legend in block 56. The clips provided by the playback system 50 to the news room computer system, the editor and/or asset management system (NewsBrowse) can include status metadata, as indicated by the legend in block 58. Metadata typically in the form of status information, as indicated by the legend in block 59, can accompany the audio and/or video information received by the switcher/production system 57 from the payback unit 52. Metadata, typically containing formation related to stories, slugs, running order on-air talent graphics special effects, character generator data, production techniques, camera data and the like, as indicated by the legend in block 60, can accompany assignment information and other data received by the switcher/production system 57 from the server 24. Metadata, typically in the form of character generator proxy and insertion information, as indicated by the legend in block 62, can accompany the audio and/or video information, and other metadata, received by the switcher/production system 56 from the news edit terminal 48.

The switcher/production system 57 can supply audio and/or video information (and accompanying metadata) to the playback unit 50 and to other system devices (not shown). The audio and/or video information supplied by the switcher/production system 57 to the playback unit 50 can include metadata containing status information; such information associated with released audio and/or video information, as indicated by the legend in block 64. The audio and/or video information and accompanying metadata supplied from the switcher/production system 57 to the other system devices, can include metadata related to Global Positioning Satellite data and lens information for the capture device 40 or other such devices (not shown), graphics and character generator information, aspect ratio to the switcher/production system, for example, as indicated by the legend in block 66.

The foregoing describes a technique capturing and processing metadata during production of an audio visual program.

The invention claimed is:

1. A method for audio and video production, comprising:
at a server, receiving assignment information having first metadata with media object server identification information from a newsroom computer system, wherein the first metadata contains pre-production information related to the assignment information, and further wherein assignment information is associated with a news story to be pursued by news gathering personnel;
from the server, transmitting the first metadata to a field device as instructions for the news gathering personnel to pursue the news story;
at the server, receiving audio and visual information from the field device operated by a videographer, the audio and visual information having second metadata related to capturing the audio and video information with a video camera by the videographer, the second metadata including the media object server identification information and additional information related to the capture and assignment information to the second metadata, wherein the audio and visual information is received at the server in a file structure that comprises the second metadata entered into the file structure of the captured audio and video information;
at the server, associating the assignment information with the audio and video information received from the field device by matching the media object server identification information of the first metadata with the media object server identification information of the second metadata received from the field device;
at the server, updating the first metadata with status information related to the second metadata received from the field device; and
at the server, providing the updated first metadata to a newsroom computer system.

2. The method of claim 1, wherein the field device separately receives the assignment information having the first metadata from the newsroom computer system.

3. The method of claim 2, wherein the field device incorporates the first metadata as part of the second metadata after capture of the audio and visual information.

4. The method of claim 2, wherein the field device edits the first metadata to include information related to the second metadata after capture of the audio and visual information.

5. The method of claim 1, wherein the field device comprises the video camera as a capture device configured to capture the audio and video information.

6. The method of claim 1, wherein the field device communicates with the video camera which comprises a capture device configured to capture the audio and video information.

7. The method of claim 1, wherein the newsroom computer system transmits the assignment information with the first metadata to the field device prior to capturing the audio and visual information.

8. The method of claim 1, wherein the assignment information is provided by an assignment editor and includes instructions for capturing the audio and visual information.

9. The method of claim 1, wherein the identity information comprises information related to a media object server identification (MOS-ID).

10. The method of claim 1, wherein the assignment information is received from the newsroom computer system over a wireless communication network.

11. The method of claim 1, wherein the audio and visual information is received from the field device over a wireless communication network.

12. The method of claim 1, wherein the first metadata includes information related to at least one of assignment data, location data, personnel data, story data, and individuals for interview data.

13. The method of claim 1, wherein updating the second metadata includes updating status information related to the audio and video information received from the field device.

14. The method of claim 1, wherein the second metadata includes information gathered by a news reporter at a story location.

15. The method of claim 1, wherein the second metadata includes information related to capturing an image.

16. The method of claim 15, wherein the information related to capturing an image comprises at least one selected from a group consisting of a camera setting, a bearing lens setting, an aspect ratio, information relating to key presses by a camera operator, and a shot type.

17. The method of claim 1, wherein the first metadata comprises information from newswire services along with the assignment information.

18. An apparatus for audio and video production, comprising:
a server configured to:
receive assignment information having first metadata with media object server identification information from a newsroom computer system, wherein the first metadata contains pre-production information related to the assignment information, and further wherein assignment information is associated with a news story to be pursued by news gathering personnel;
transmit the first metadata to a field device as instructions for the news gathering personnel to pursue the news story;
receive audio and visual information from the field device operated by a videographer, the audio and visual information having second metadata related to capturing the audio and video information with a video camera by the videographer, the second metadata including the media object server identification information and additional information related to the capture and assignment information to the second metadata, wherein the audio and visual information is received at the server in a file structure that comprises the second metadata entered into the file structure of the captured audio and video information;
associate the assignment information with the audio and video information received from the field device by matching the media object server identification information of the first metadata with the media object server identification information of the second metadata received from the field device;
update the first metadata with status information related to the second metadata received from the field device; and
provide the updated first metadata to a newsroom computer system.

19. The apparatus of claim 18, wherein:
the field device separately receives the assignment information having the first metadata from the newsroom computer system, and
the field device incorporates the first metadata as part of the second metadata after capture of the audio and visual information.

20. The apparatus of claim 18, wherein the field device comprises the video camera as a capture device configured to capture the audio and video information.

21. The apparatus of claim 18, wherein the field device communicates with the video camera which comprises a capture device configured to capture the audio and video information.

22. The apparatus of claim 18, wherein the assignment information is provided by an assignment editor and includes instructions for capturing the audio and visual information.

23. The apparatus of claim 18, wherein the identity information comprises information related to a media object server identification (MOS-ID).

24. The apparatus of claim 18, wherein:
the assignment information is received from the newsroom computer system over a wireless communication network, and
the audio and visual information is received from the field device over the wireless communication network.

25. The apparatus of claim 18, wherein the first metadata includes information related to at least one of assignment data, location data, personnel data, story data, and individuals for interview data.

26. The apparatus of claim 18, wherein updating the second metadata includes updating status information related to the audio and video information received from the field device.

27. The apparatus of claim 18, wherein the second metadata includes information gathered by a news reporter at a story location.

28. The apparatus of claim 18, wherein the second metadata includes information related to capturing an image.

29. The apparatus of claim 28, wherein the information related to capturing an image comprises at least one selected from a group consisting of a camera setting, a bearing lens setting, an aspect ratio, information relating to key presses by a camera operator, and a shot type.

30. The apparatus of claim 18, wherein the first metadata comprises information from newswire services along with the assignment information.

31. The apparatus of claim 18, wherein the newsroom computer system transmits the assignment information with the first metadata to the field device prior to capturing the audio and visual information.

32. The apparatus of claim 18, wherein the field device separately receives the assignment information having the first metadata from the newsroom computer system, and
wherein the field device edits the first metadata to include information related to the second metadata after capture of the audio and visual information.

33. A non-transitory computer readable storage medium comprising codes executable to cause a server to:
receive assignment information having first metadata with media object server identification information from a newsroom computer system, wherein the first metadata contains pre-production information related to the assignment information, and further wherein assignment information is associated with a news story to be pursued by news gathering personnel;
transmit the first metadata to a field device as instructions for the news gathering personnel to pursue the news story;
receive audio and visual information from the field device operated by a videographer, the audio and visual information having second metadata related to capturing the audio and video information with a video camera by the videographer, the second metadata including the media object server identification information and additional information related to the capture and assignment information to the second metadata, wherein the audio and visual information is received at the server in a file structure that comprises the second metadata entered into the file structure of the captured audio and video information;

associate the assignment information with the audio and video information received from the field device by matching the media object server identification information of the first metadata with the media object server identification information from the second metadata received from the field device;

update the first metadata with status information related to the second metadata received from the field device; and provide the updated first metadata to a newsroom computer system.

\* \* \* \* \*